United States Patent [19]

Salm

[11] Patent Number: 5,790,852
[45] Date of Patent: Aug. 4, 1998

[54] COMPUTER WITH EXTENDED VIRTUAL STORAGE CONCEPT

[75] Inventor: Ingolf Salm, Gaeufelden, Germany

[73] Assignee: International Business Machines Corporation, Armonk, N.Y.

[21] Appl. No.: 750,807

[22] Filed: Aug. 27, 1991

[30] Foreign Application Priority Data

Sep. 3, 1990 [EP] European Pat. Off. ............ 90116847

[51] Int. Cl.[6] ............................................. G06F 15/40
[52] U.S. Cl. ........................ 395/674; 711/147; 173/153
[58] Field of Search ............................. 395/650, 700, 395/651, 674; 364/DIG. 1; 711/6, 147, 148, 153, 170, 171, 172, 173

[56] References Cited

U.S. PATENT DOCUMENTS

| 4,511,964 | 4/1985 | Georg et al. | 364/200 |
| 4,965,717 | 10/1990 | Cutts, Jr. et al. | 364/200 |
| 5,023,773 | 6/1991 | Baum et al. | 364/200 |
| 5,117,350 | 5/1992 | Parrish et al. | 395/425 |

OTHER PUBLICATIONS

IBM Manual (SC33-6405-01) VSE/SP Administration.
IBM Manual (SC33-6352-00) VSE/AF System Management Guide.
CMS Application Development Guide for Assembler Chapter 6 Using Free Storage.

*Primary Examiner*—Emanuel Todd Voeltz
*Assistant Examiner*—Kakali Chaki
*Attorney, Agent, or Firm*—Arthur J. Samodovitz

[57] ABSTRACT

In a computer including an operating system comprising a virtual storage organization concept providing storage space for parallel program execution in pre-allocated partitions of a virtual address storage containing shared areas and private areas in several address spaces, there are provided dynamic partitions (P1, P2, ... N1, N2, ... O1, O2, ...) that are allocatable in addition to the pre-allocated partitions (F1–F8, FA, FB, BG), in dependance from the job to be performed and that are de-allocated after job termination to free the storage area for subsequent use. This concept enlarges the virtual storage area, uses the provided space more effectively and allows the parallel execution of more programs.

11 Claims, 8 Drawing Sheets

STATIC PARTITION
ADDRESS SPACE LAYOUT

DYNAMIC PARTITION
ADDRESS SPACE LAYOUT

IESADMSL.IESEDEF          RESOURCE DEFINITION          APPLID: CICS

Enter the number of your selection and press the ENTER key:

1   User Interface Tailoring
    2   File and Catalog Management
    3   Display VTOC
    4   Hardware Configuration and IPL
    5   Maintain VTAM Application Names
    6   Maintain VTAM Startup Options
    7   Maintain Dynamic Partitions PF1=HELP            3=END            4=RETURN            6=ESCAPE(U)
                    9=Escape(m)

==> 7                                                    Path: 2

FIG. 4

TAS$DYN1          MAINTAIN DYNAMIC PARTITIONS

ENTER OPTION(S) AND PRESS ENTER.

OPTIONS:   1 = ADD           2 = ALTER           5 = DELETE

| OPT | DYNAMIC CLASS | ENABLED 1 = YES 2 = NO | MAX NO. OF PARTITIONS | STORAGE ALLOCATION | MAXIMUM PROGRAM SIZE | DYNAMIC SPACE GETVIS | PROFILE |
|---|---|---|---|---|---|---|---|
| _ | C | 1 | 9 | 1M | 500K | 64K | STDPROF |
| _ | Y | 1 | 8 | 2M | 1024K | 64K | STDPROF |
| _ | Z | 1 | 3 | 5M | 1024K | 64K | STDPROF |
| _ | | | | | | | |
| _ | | | | | | | |
| _ | | | | | | | |
| _ | | | | | | | |
| _ | | | | | | | |
| _ | | | | | | | |

PF1=HELP      2=REDISPLAY   3=END              5=PROCESS

FIG.5

```
TAS$DYN2                MAINTAIN DYNAMIC PARTITIONS

Enter the required data and press ENTER.

DYNAMIC CLASS............  X         Enter one of the classes C - E, G - Z
NUMBER OF PARTITIONS.....  8         Enter a number between 1 and 32
STORAGE ALLOCATION.......  3M        Specify in M bytes
MAXIMUM PROGRAM SIZE.....  1M        Specify in K or M bytes
DYNAMIC SPACE GETVIS.....  64K       Specify in K bytes
ENABLED..................  1         1=YES, 2=NO
PROFILE..................  STDPROF   Name of the JCL procedure
NUMBER OF LOGICAL UNITS..  50        Enter a number between 10 - 255

READER-DEVICE............  FEC       ----  ----  ----  ----
LIST OF PRINTER DEVICES..  FEE       ----  ----  ----  ----
                           ----      ----  ----  ----  ----
LIST OF PUNCH DEVICES....  FED       ----  ----  ----  ----
                           ----

PF1=HELP      2=REDISPLAY   3=END
```

FIG.6

TAS$DYN1          MAINTAIN DYNAMIC PARTITIONS

ENTER OPTION(S) AND PRESS ENTER.

OPTIONS:    1 = ADD          2 = ALTER          5 = DELETE

| OPT | DYNAMIC CLASS | ENABLED 1 = YES 2 = NO | MAX NO. OF PARTITIONS | STORAGE ALLOCATION | MAXIMUM PROGRAM SIZE | DYNAMIC SPACE GETVIS | PROFILE |
|---|---|---|---|---|---|---|---|
| _ | C | 1 | 9 | 1M | 500K | 64K | STDPROF |
| _ | Y | 1 | 8 | 2M | 1024K | 64K | STDPROF |
| _ | Z | 1 | 3 | 5M | 1024K | 64K | STDPROF |
| _ | X | 1 | 8 | 3M | 1024K | 64K | STDPROF |

PF1=HELP      2=REDISPLAY    3=END              5=PROCESS

FIG. 7

```
01 PLOAD DYNCTAB
02 AR 015 1C39I COMMAND PASSED TO VSE/POWER
03 F1 001 1Q6AI ****** DISPLAY OF ACTIVE DYNAMIC CLASS TABLE ****
04 F1 001 1Q6AI CLS STATE   ACT/MAX ALLOC  SIZE   SP-GETV  PROFILE  LUBS
05 F1 001 1Q6AI  C  ENAB     0   9    1M    500K    64K    STDPROF   50
06 F1 001 1Q6AI  Y  ENAB     0   8    2M   1024K    64K    STDPROF   50
07 F1 001 1Q6AI  Z  ENAB     0   3    5M   1024K    64K    STDPROF   50
08 F1 001 1Q6AI  X  ENAB     0   8    3M   1024K    64K    STDPROF   50
09 F1 001 1Q6BI DYNAMIC CLASS TABLE LOADED SUCCESSFULLY
10
11
12
13
14
15
16
17
18
19
20
```

FIG. 8

```
===>
<<..+....1....+....2....+....3....+....4....+....5....+.. MEM=TESTX    >
* $$ JOB JNM=TESTX,DISP=L,CLASS=X
// JOB TESTX
// EXEC TEST
/&
* $$ EOJ
***** END OF FILE ******
```

FIG. 9

```
01  AR  015  1C39I  COMMAND PASSED TO VSE/POWER
02  F1  001  1Q6AI  ****** DISPLAY OF ACTIVE DYNAMIC CLASS TABLE *****
03  F1  001  1Q6AI  CLS STATE   ACT/MAX ALLOC  SIZE   SP-GETV  PROFILE  LUBS
04  F1  001  1Q6AI   C  ENAB    0   9    1M    500K    64K     STDPROF   50
05  F1  001  1Q6AI   Y  ENAB    0   8    2M   1024K    64K     STDPROF   50
06  F1  001  1Q6AI   Z  ENAB    0   3    5M   1024K    64K     STDPROF   50
07  F1  001  1Q6AI   X  ENAB    0   8    3M   1024K    64K     STDPROF   50
08  F1  001  1Q6BI  DYNAMIC CLASS TABLE LOADED SUCCESSFULLY
09  F1  001  1Q47I  X1 TESTX 00286 FROM (SALM) , TIME=13:07:56
10  X1  020  // JOB TESTX
11      DATE 08/29/90,CLOCK 13/07/56
12  X1  020  EOJ TESTX
13      DATE 08/29/90,CLOCK 13/08/13,DURATION 00/00/17
14  F1  001  1Q3EI  DYNAMIC CLASS 'X' WAITING FOR WORK
```

FIG.10

COMPUTER WITH EXTENDED VIRTUAL STORAGE CONCEPT

BACKGROUND

The invention concerns a computer including an operating system comprising a virtual storage organization concept providing storage space for parallel program execution in pre-allocated partitions of a virtual address storage containing shared areas and private areas in several address spaces.

Such a computer and especially such an operating system is for example on the market as IBM Virtual Storage Extended/System Package Version 4 Release 1, in the following for short VSE/SP 4.1, and for example described in more detail in the associated IBM manuals of which Administration, Form Number SC33-6405-01, is cited here for reference purposes. The VSE/SP 4.1 operating system includes as one program the IBM licensed program VSE/ Advanced Functions (VSE/AF for short in the following), as well as others of which VSE/POWER should be mentioned also. Reference is made to the IBM manual IBM VSE/ Advanced Functions System Management Guide Version 4 Release 1, Form Number SC33-6352-00. In this manual, especially on pages 1 to 20, a more detailed description is given concerning e.g. multiprogramming, virtual storage and real storage organization, partitions, as well as storage allocation.

In the current system the virtual storage is limited to 12 partitions in up to nine address spaces. This requires a very careful and difficult allocation of storage space in the given address spaces to the programs to run in parallel. This limits the possibility of parallel program execution considerably and thus makes the system somewhat inflexible.

It is the primary object of the present invention to make the system more flexible, enlarge the virtual storage resources such that in an easy way more programs can be executed in parallel, and be tolerable to the existing system.

SUMMARY

The invention resides in a computer system comprising a virtual storage, and means for organizing the virtual storage to provide storage space for parallel program execution in pre-allocated partitions. The virtual storage contains shared areas and private areas in a plurality of address spaces. Depending on the job to be performed, the organizing means allocates one or more dynamic partitions in the private areas in addition to the pre-allocated partitions, and the dynamic partitions are de-allocated after job termination to free the storage area for other use.

Thus, dynamic partitions are allocated together with a job and de-allocated with job termination, and a tremendous expansion of the virtual storage area of up to (or more) 200 new partitions is provided. This means that many more programs can be executed in parallel and existing system limitations are overcome.

BRIEF DESCRIPTION OF THE FIGURES

In the following the invention will be explained in more detail in connection with the shown and described embodiment, and the figures in which.

DETAILED DESCRIPTION OF THE PREFERRED EMBODIMENTS

For a better understanding of the dynamic partition concept and how it is imbedded in the VSE operating system, a short description of the current partition design is given. In connection with the description of the invention the current partitions are called static or pre-allocated partitions.

Pre-allocated, Static Partitions

The current VSE version (VSE/SP 4.1) allows to allocate 12 partitions in up to nine address spaces. An address space contains a shared area and a private area. The shared area is for all address spaces the same. The private area differs dependent on the allocation. It is possible to allocate more than one partition in one private area. Static partitions have the following predefined identifier ids F1, F2, F3, F4, F5, F6, F7, F8, F9, FA, FB, BG.

Figure 1:
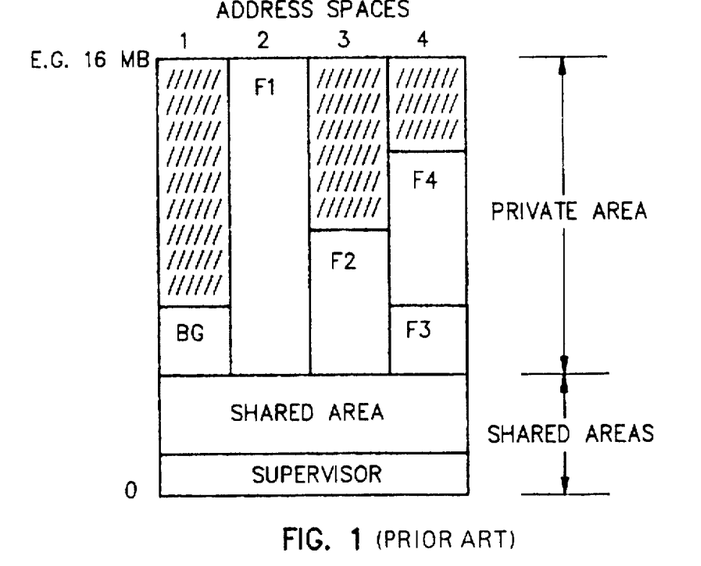
FIG. 1 shows the storage layout as known from prior art of pre-allocated or static partitions.

The storage layout shown in FIG. 1 depicts as an example of the known prior art system with five partitions BG, F1, F2, F3 and F4 allocated in address spaces 1 to 4. One address space might have a maximum size of e.g. 16 Mbyte (MB). The address spaces are divided in shared areas and a private area. The private area is the program area for program execution. An operator or ASI (Automated System Initialization) procedure may allocate and start the partitions and give an execution priority to every partition. This pre-allocation of the static partitions is done in the phase of system setup.

Static partitions may get JCL (Job Control Language) statements from a physical reader or the job scheduler. In VSE the job scheduling, execution control and output spooling of a job is done by VSE/POWER, that is a job is VSE/POWER controlled. VSE/POWER (POWER stands for Priority Output Writer Execution Reader and is an IBM licensed program primarily used for spooling input and output) may also start the static partitions and run jobs in them, that is VSE/POWER feeds JCL statements and data to the partition. The jobs are located in the reader queue. The list or punch output may be directed to the corresponding queues.

The static partition is available for more than one job. VSE/POWER allows to execute jobs in classes, the so called VSE/POWER classes, where one or more static partitions may be assigned to. A class means a group of jobs that either come from the same input device or go to the same output device.

Dynamic Partitions

A spooling program like VSE/POWER allocates and starts a dynamic partition for one job. VSE/POWER controls the execution of the job and de-allocates the dynamic partition after end of job. The freed storage is available for another job.

Each dynamic partition has its own address space, that is only one dynamic partition is allocated in the private area of such an address space. Multiple dynamic partitions may be allocated at a time.

Figure 2:
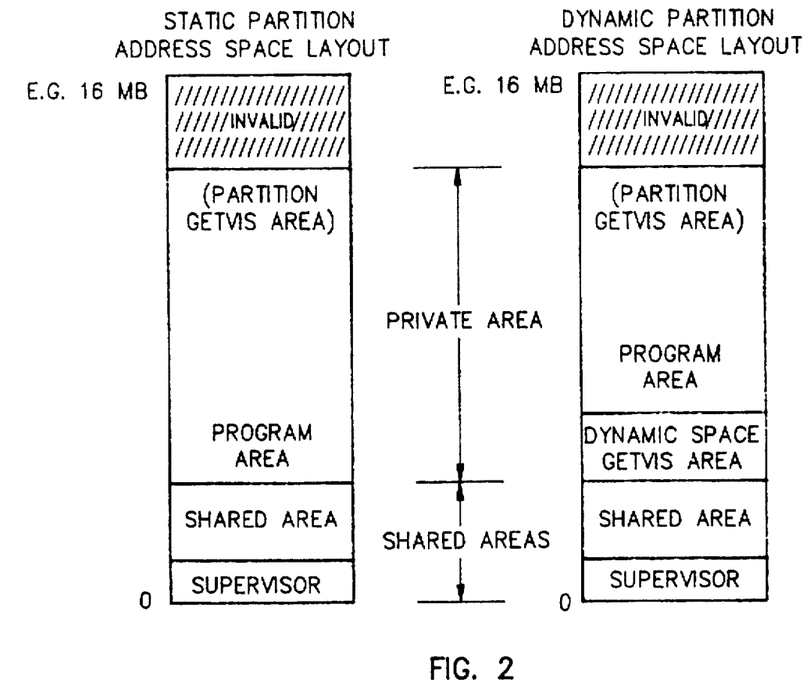
FIG. 2 shows side by side an address space layout for static and dynamic partitions in accordance with the invention.

To reduce the size of the shared areas a new (private) system area is introduced for dynamic partition address spaces called dynamic space GETVIS. The dynamic space GETVIS area belongs to the private area. FIG. 2 shows a comparison of static and dynamic partition address space layout.

In the left part of FIG. 2 the layout of the static partition is shown, containing supervisor and shared area in the shared areas, and the program area in the private area.

There a partition GETVIS area might be contained also. This is a storage space within a partition that is available for temporary allocation to the associated program of that partition.

In the right part of FIG. 2 the layout of the dynamic partition in accordance with an embodiment of the invention is shown. As can be seen in contrast to the static partition layout in the private area an area named dynamic space GETVIS area is provided.

The dynamic space GETVIS area is allocated temporarily together with the dynamic partition and contains system data for the address space. Those system data are unique for the job and thus also for the allocated dynamic partition. Therefore these data are not necessary for other partitions and not necessarily to be contained in the shared area. Therefore the shared area is alleviated of these data and hence can be kept smaller.

Dynamic partitions can be grouped into classes corresponding to the VSE/POWER classes, where jobs can be executed. These classes are called dynamic classes.

Only the priority of the dynamic class can be specified. Dynamic partitions within one and the same class are time sliced.

Static and dynamic partitions may be grouped in one VSE/POWER class.

A table, the so called dynamic class table, contains the attributes of the dynamic classes. The dynamic class table may be cataloged in the library, from were it can be loaded.

Some dynamic class table attribute examples are:

storage allocation:
  specifies the storage requirements of a dynamic partition (Dynamic Space GETVIS and partition allocation) of the given class, partition SIZE:
  defines the amount of contiguous virtual storage in a partition reserved for program execution; the rest of the partition is available as partition GETVIS area, Dynamic Space GETVIS size:
  defines the amount of contiguous virtual storage for the Dynamic Space GETVIS area (refer to FIG. 2), profile(procedure):
  will be executed in the partition prior to the job (corresponds to ASI procedure of static partitions), max. number of dynamic partitions within class:
  specifies the maximum number of partitions that can be allocated in parallel within the given class, when enough virtual storage and dynamic partitions are available;

disable indication
  allows to disable a dynamic class, that is no job can be executed within this class;

spooled I/O devices:
  specifies the spooled devices, e.g. reader, printers and punches which interfaces to VSE/POWER.

Dynamic partition ids are built as follows:
  <class><pno>
  where <class>=dynamic class (one character, defined by user)
  <pno>=partition number within dynamic class For example receives the first dynamic partition allocated in a dynamic class P the identifier id P1.

Figure 3:
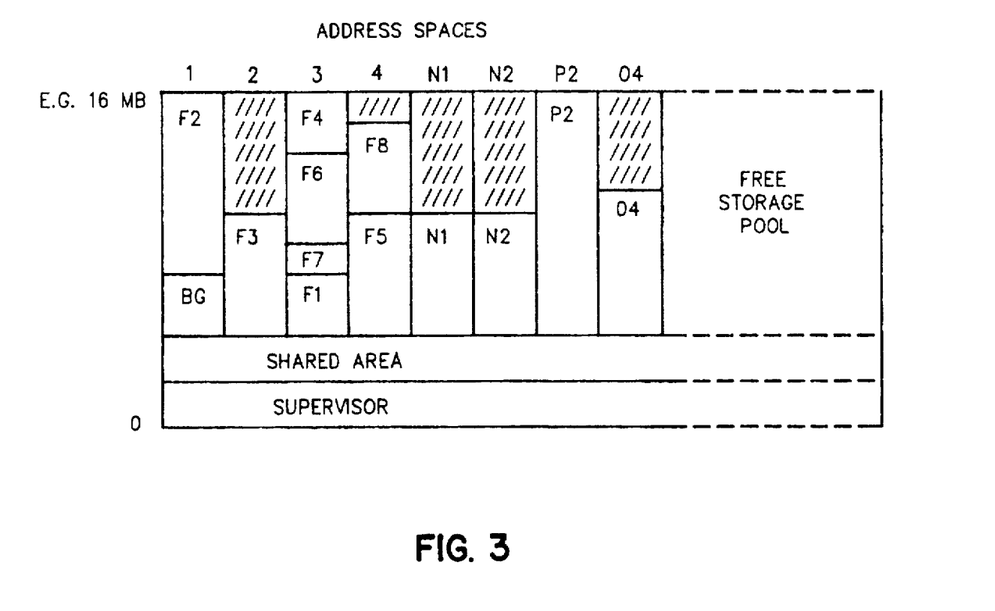
FIG. 3 shows an example of a storage layout with dynamic partitions in accordance with the invention.

The following example as depicted in FIG. 3 shows a storage layout with partitions BG, F1–F8 in address spaces 1 to 4, dynamic partitions of dynamic class N in address spaces N1 and N2, one dynamic partition in address space P2 and one dynamic partition in address space 04.

In the example of a storage layout shown in FIG. 3, in the dynamic class N only the address spaces N1 and N2 are allocated at a time, whereas the other address spaces in this class are not active. The same is true for the address space P2 of class P, where P2 is the only active dynamic partition of class P. From class 0 only address space 04 is active in the shown example. The configuration of this example shows that only those dynamic partitions are active in the virtual storage area, that actually have running jobs. If jobs allocated to dynamic partitions are not active, their allocated virtual storage can be used for other purposes. This shows, that the dynamic partition concept provides an optimal use of the virtual storage that can be used, as always only that virtual storage of the free storage pool is used that is actually needed.

Dynamic Partitions and Ease of Use

The following items show how easy it is to process jobs in dynamic partitions:

1. Definition:
The dynamic class table allows to define the attributes of dynamic partitions in only a few statements (see also FIG. 5, 6 and 7).

2. Dynamic partitions allocated when needed:
Dynamic partitions are only allocated, when a job is to be executed in a dynamic class. This saves system resources. If a VSE/POWER class contains static and dynamic partitions, static partitions will usually be used first for job execution.

3. Automatic allocation, initialization and deactivation:
The job's environment and resources are allocated and released automatically without user intervention.

4. Identical resource allocation within one dynamic class:
Resources needed for the job are allocated prior to job execution.

5. Time slicing:
There is no need to control CPU intensive jobs, because after the time slice of a job is exhausted the job is moved to lowest priority position within the dynamic class.

6. Migration from static to dynamic partitions:
It is easy to migrate jobs to dynamic partitions, because the design avoids incompatibilities. Concept The concept shows, how dynamic classes can be defined and how dynamic partitions are created and released, when the system resources are available (e.g. virtual storage).

The following paragraphs describe
a. dynamic class table maintenance,
b. dynamic partition dispatching,
c. job execution.
1) Submit Job to be executed in a dynamic class
2) VSE/POWER requests dynamic partition allocation
   create dynamic partition
3) VSE/POWER starts the dynamic partition
   make dynamic partition dispatchable
4) dynamic partition initialization
   initialize address space run dynamic class profile
5) job execution
6) end of job process
7) dynamic partition deactivation
    free system resources
    stop partition
        make dynamic partition undispatchable
8) de-allocate the dynamic partition
    remove partition from dispatching queue
Maintain the Dynamic Class Table (Create, Store and Load)

Any editor or the VSE dialog may create and change the dynamic class table. Services are available to store the table into the library from where the operator or the VSE/POWER ASI procedure may load the table.

The load process validates the dynamic class table values and translates the information into an internal representation. Invalid entries are shown on the console. Only valid entries can be activated, that is the dynamic class table is stored into the system storage, i.e. it is addressable by system routines. The dynamic classes receive a predefined dispatching priority. An operator may change the priority by the priority command.

A following load request may change or remove dynamic class table entries. A load request is rejected, when a dynamic class to be removed has allocated dynamic partitions.

Dispatching

One VSE partition consists of a main task and attached subtasks, where the main task has always the lowest priority within the partition.

The current VSE system (VSE/SP 4.1) has a two level dispatching scheme:
1. The highest priority partition ready to run is selected from the dispatcher queue.
2. The corresponding highest priority (sub)task ready to run is selected and dispatched.

With the dynamic partition support a new level of dispatching for dynamic partitions is introduced. Every dynamic class has its own dispatcher queue, which has entries for all allocated dynamic partitions of the given class. As mentioned earlier dynamic classes are included into the dispatcher queue, which leads to a three level dispatching scheme:
1. The highest priority static partition or dynamic class ready to run is selected from the dispatcher queue.
2. If a dynamic class is selected, the highest priority dynamic partition of the class ready to run is determined.
3. The corresponding highest priority (sub)task ready to run is selected and dispatched.

The operator or a startup procedure may change the priority of static partitions and dynamic classes. To avoid that a CPU intensive partition/class can stop the dispatching of lower priority partitions/classes VSE allows to define a time sliced (balanced) group. The member of the group (static partition or dynamic class) that looses its time slice receives the lowest priority position within the group. If more than one dynamic partition is allocated within a given dynamic class the same method is used.

Job Execution

Job selection for execution in a dynamic class is possible, if the dynamic class is enabled. This is indicated in the loaded dynamic class table and can be changed by another load request or command.

The following paragraphs describe the processing after a job for an enabled dynamic class table is found.

For dynamic partition allocation and start VSE/POWER requests allocation of a dynamic partition. The allocation service builds a partition id, allocates and initializes control blocks and creates an address space. The dynamic partition is included into the dynamic class dispatcher queue. The partition start service makes the dynamic partition dispatchable, i.e. ready to run, and starts initialization. If a second dynamic partition is allocated within the same dynamic class, time slicing for the dynamic class is started.

During dynamic partition initialization the address space is validated, job control is loaded and the dynamic partition prepared. A few system routines may be executed during preparation. Job control executes the profile. If the initialization cannot complete, the partition will be cancelled, deactivated, de-allocated and the dynamic class disabled to avoid execution of other jobs. After successful initialization the job is executed, that is VSE/POWER passes JCL and data to the dynamic partition. VSE/POWER requests deactivation, when the end of the job is reached.

For dynamic partition deactivation system routines called during preparation are notified that deactivation is requested. The system frees resources, stops the dynamic partition and makes the partition undispatchable. VSE/POWER de-allocates the partition.

For dynamic partition deallocation the deallocation service frees the partition id and system space allocated for control information (control blocks). It removes the dynamic partition from the dynamic class dispatching queue. If only one dynamic partition remains in the dynamic class, time slicing for the dynamic class will be reset.

In connection with FIG. 4 to 10 the definition and usage of a dynamic class thus the dynamic partition will be described. The Figs. show screen menus or panels. An interactive dialog between the system and the user is performed with the help of these panels.

The shown scenario is used to define a dynamic class, to update the dynamic class table in the system library, to activate the dynamic class table by using the VSE/POWER PLOAD command and to execute a VSE/POWER job in the defined dynamic class.

Figure 4:
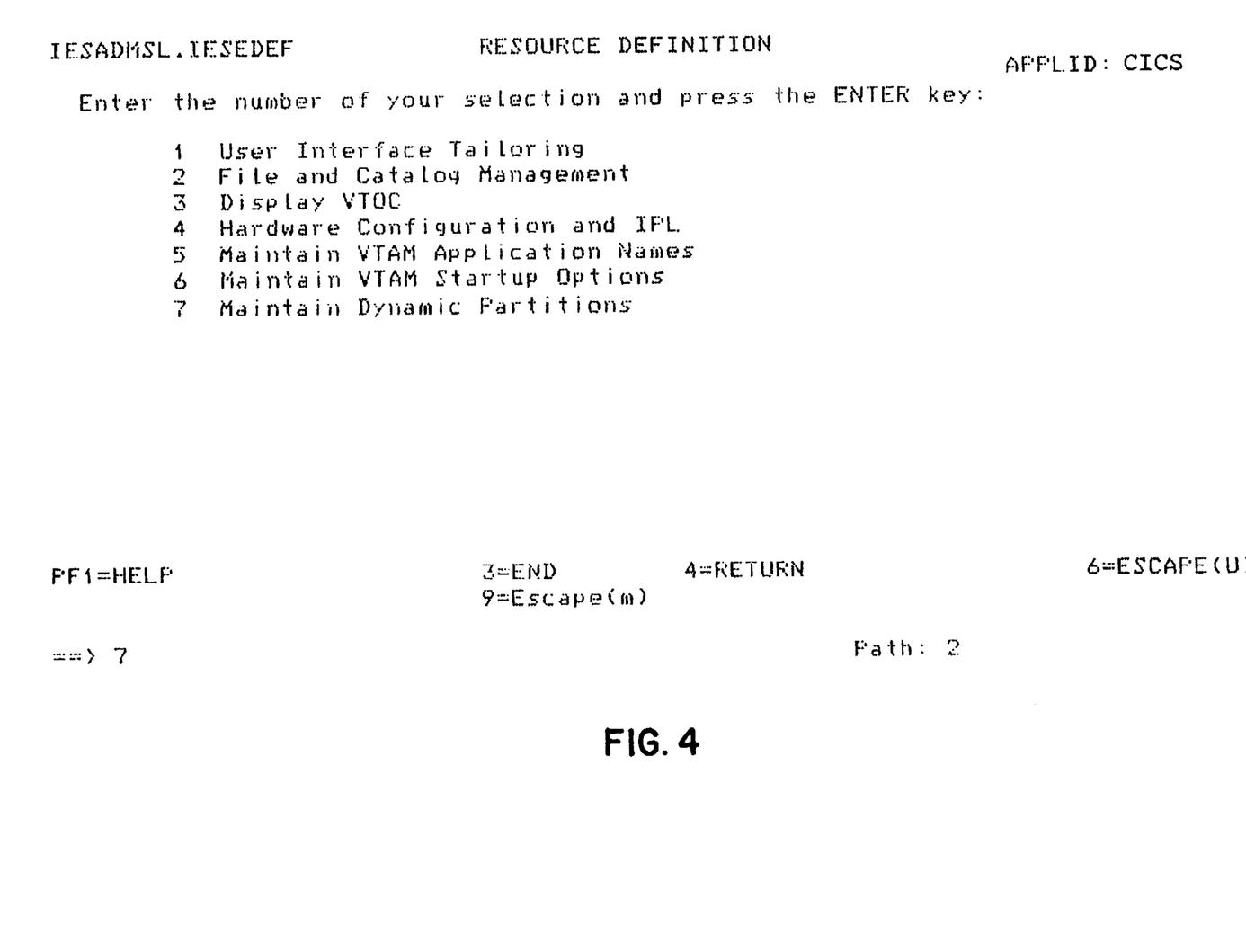
FIG. 4 shows a screen menu with a scenario for selecting the task: maintaining dynamic partitions.

In FIG. 4 there is shown the panel "resource definition". In this panel under number 7 the selection "maintain dynamic partitions" can be made by entering the number 7.

Figure 5:
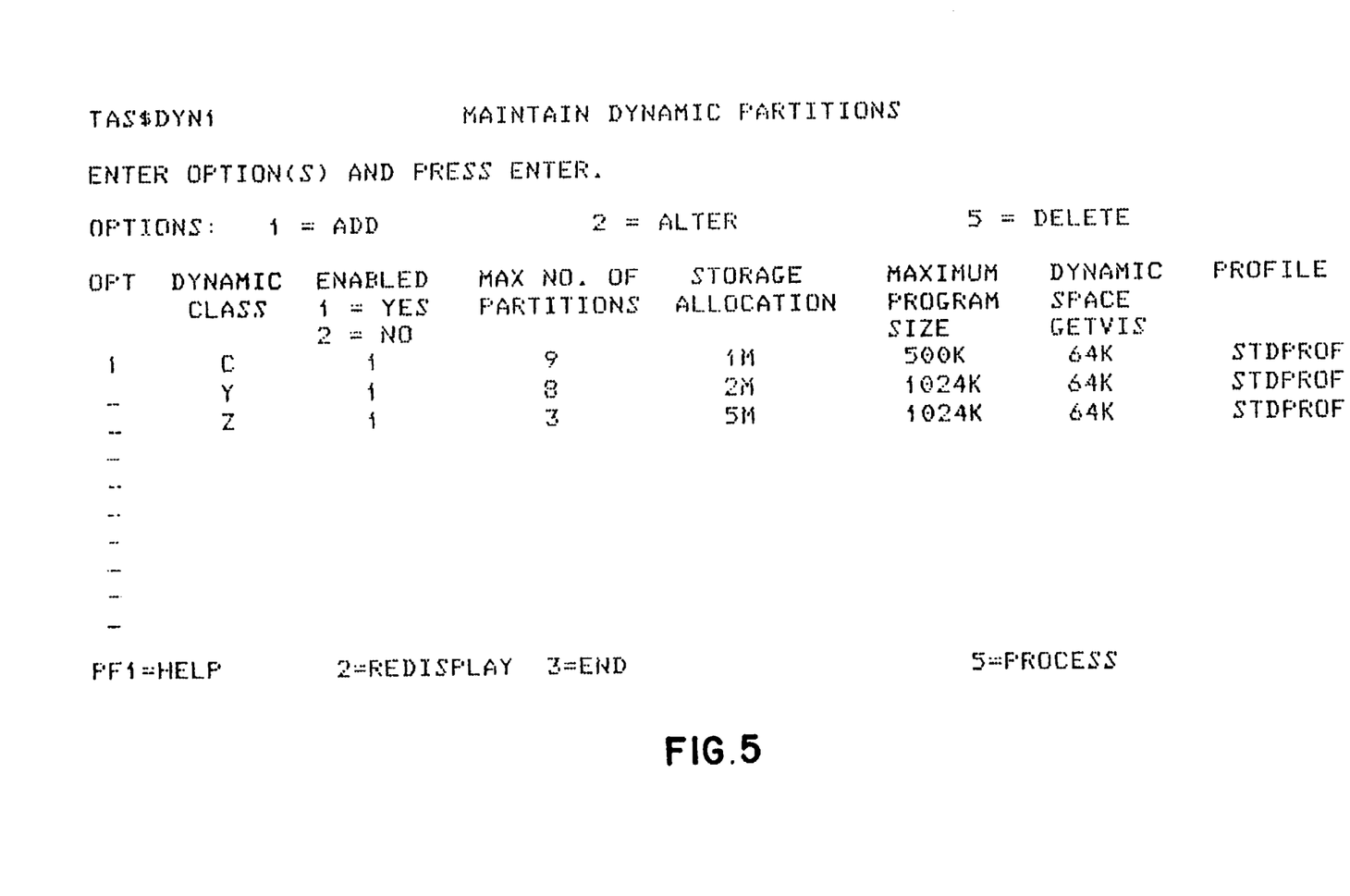
FIG. 5 shows a screen menu with a scenario to add a dynamic class.
Figure 6:
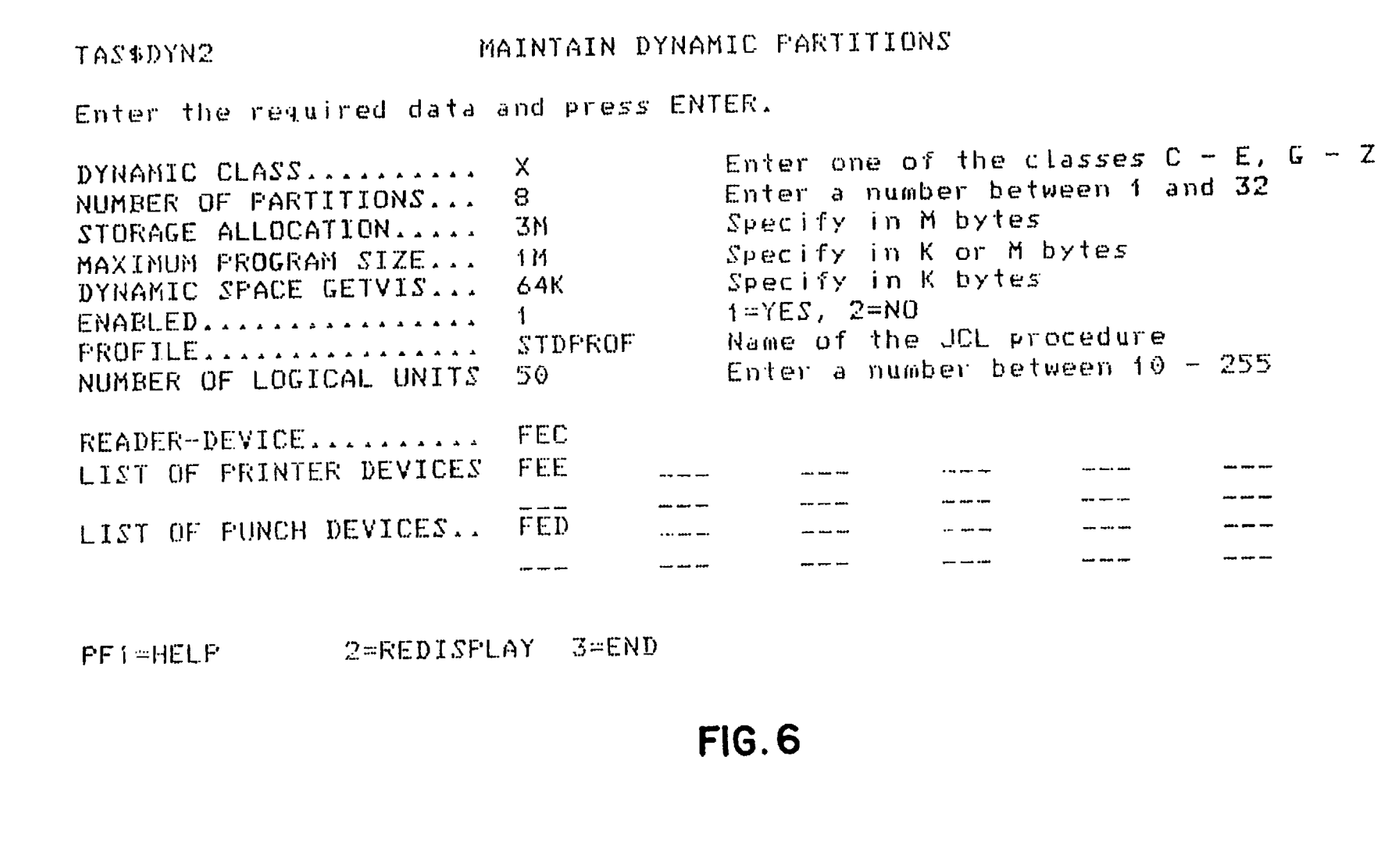
FIG. 6 shows a screen menu with a scenario of defining dynamic class X.

By the selection made in accordance with FIG. 4, the panel shown in FIG. 5 "maintain dynamic partitions" is shown. To define and add a new dynamic class, in the panel shown in FIG. 5 the option 1=ADD is selected. This leads to the panel shown in FIG.6. There are shown in the left hand column essentially the attributes of the dynamic class and in the right hand column the explanations of these attributes. For defining a dynamic class for example the character X is inserted in the middle column. This dynamic class should have 8 partitions, each with a 3 MByte private area space and a 1 MByte program size. The dynamic space GETVIS area is set to 64 KByte, the attribute enabled is set to 1 which means that the class is enabled. The profile to run is the JCL procedure STDPROF. All other items are set to default values. If all those values are set, they are entered by pressing the enter key.

Figure 7:
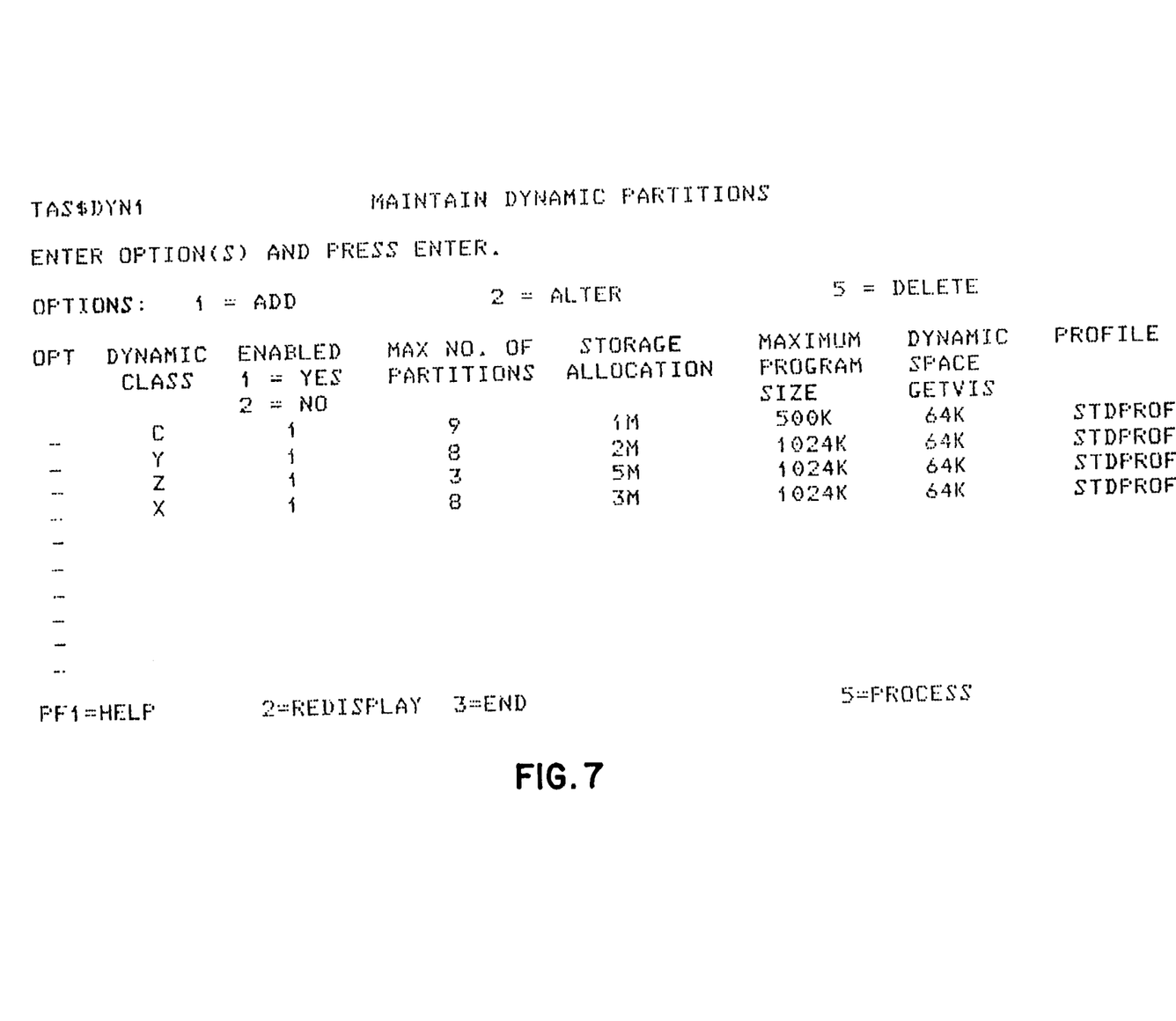
FIG. 7 shows a screen menu with a scenario to write a changed dynamic class table to the library.

This brings up the panel maintain dynamic partitions again but now showing in line 4 the added dynamic class X with all the attributes as indicated in FIG. 7. So if FIG. 7 is compared with the panel shown in FIG. 5 there are now four dynamic classes C, Y, Z and X. By pressing the "process function", laid on the function key 5, the displayed dynamic class table is now written as a new copy into the system library. So in the system there are now defined and available after activation dynamic partitions in four different classes with a maximum number of 28 dynamic partitions.

Figure 8:
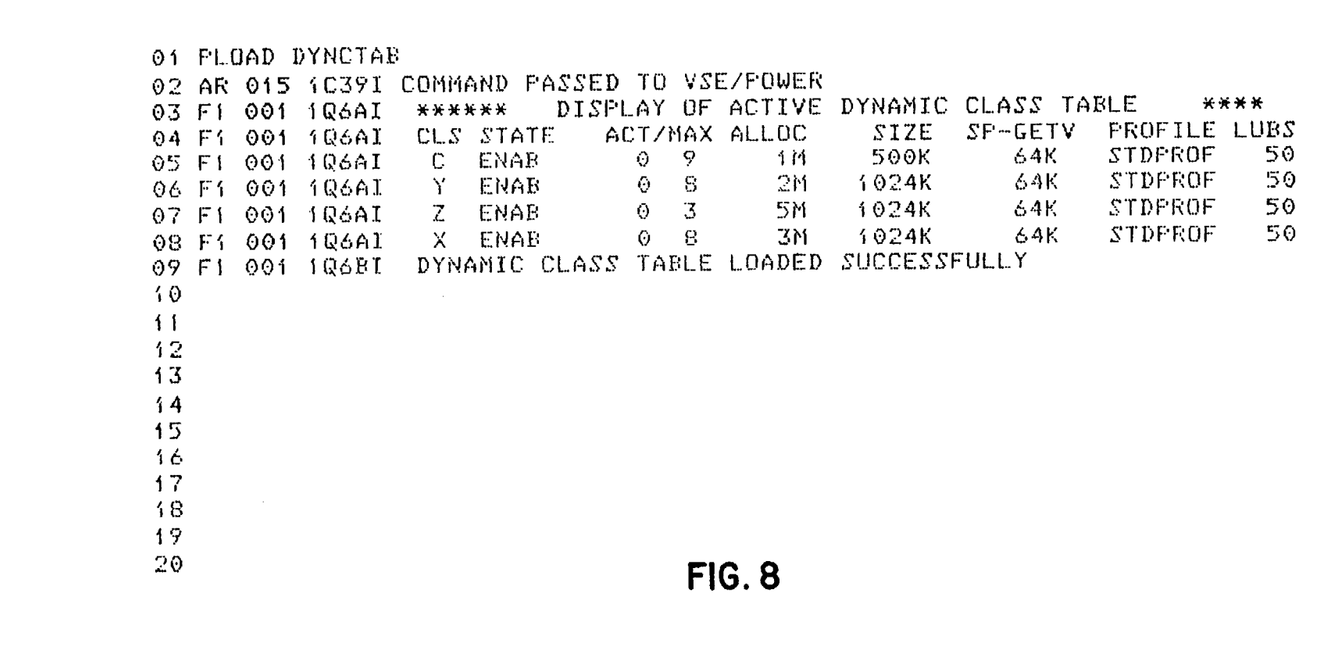
FIG. 8 shows a system console picture with a scenario to load a dynamic class table.

FIG. 8 shows a panel for dynamic class table activation. The dynamic class table, that is the dynamic class X may be used after the issuing of the VSE/POWER command PLOAD DYNCTAB from the system console. Then the system displays the active dynamic classes. As indicated in FIG. 8 none of the partitions in the four classes are active at the moment. As line 09 indicates, the dynamic class table has been loaded successfully.

Figure 9:
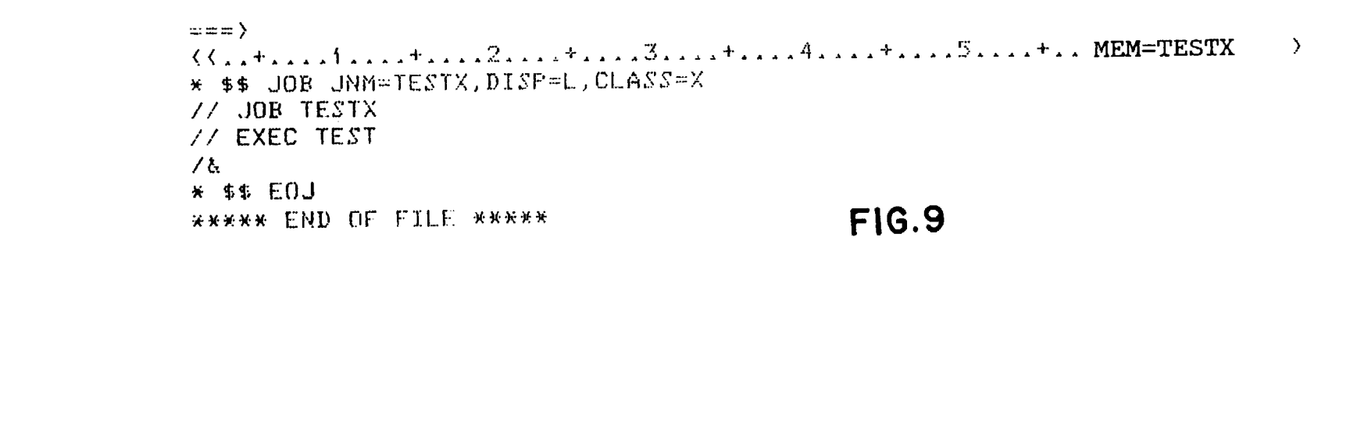
FIG. 9 shows a screen menu with a scenario to create a VSE/POWER job (class X)

It is now possible to execute a job. To that end there is submitted a VSE/POWER job stream with the dynamic class X in the class parameter of the VSE/POWER job statement. FIG. 9 shows the scenario how the job looks like.

Figure 10:
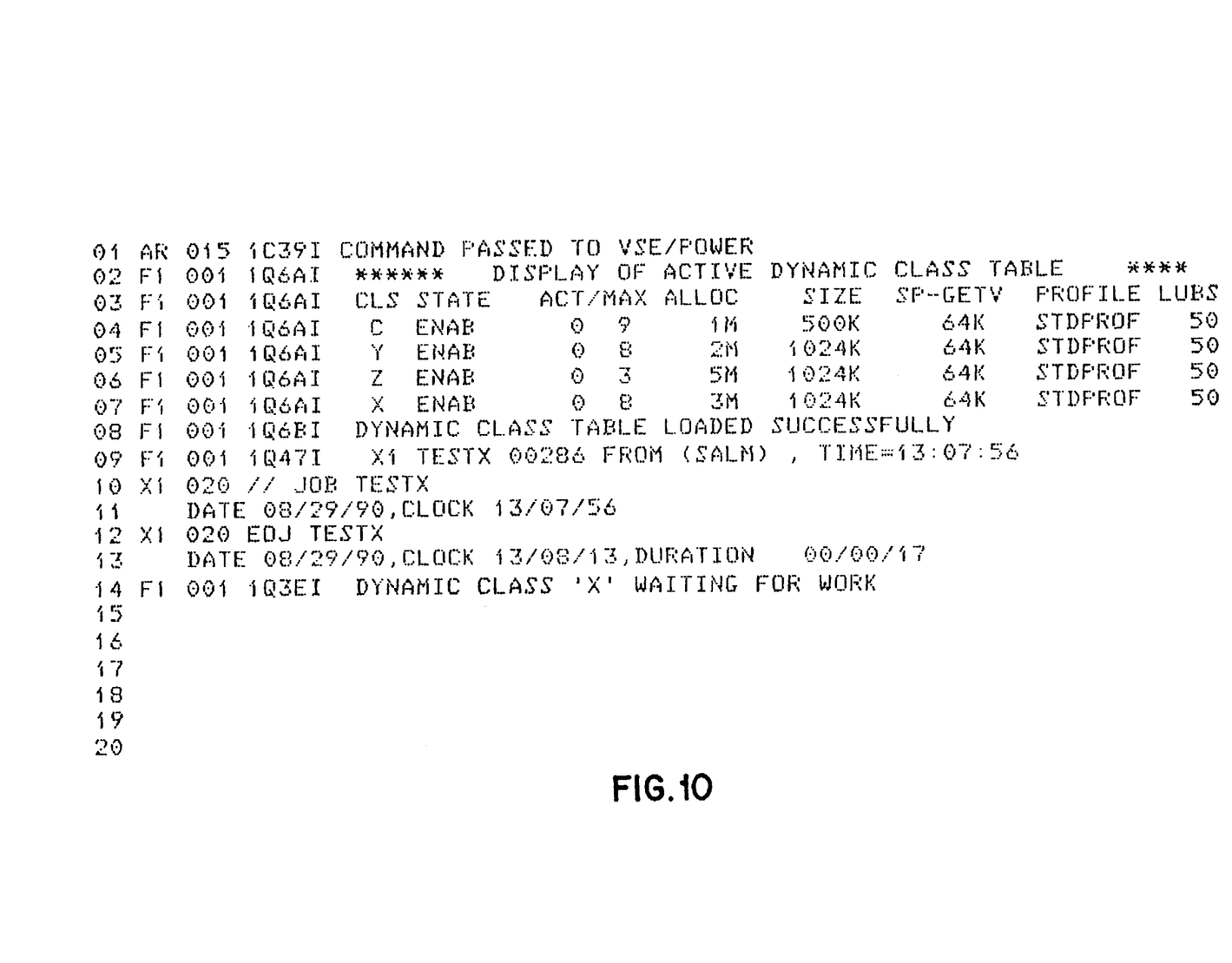
FIG. 10 shows a system console picture with a scenario of the VSE/POWER job being in execution.

The panel shown in FIG. 10 indicates how the job looks like in its execution. When a dynamic partition within dynamic class X is available, this job will be executed as in the shown example in the dynamic partition X1. After termination of this job this dynamic partition will be freed or de-allocated and is available for another job.

The advantages of the concept in accordance with the invention are that the user has only to define system resources available for dynamic partitions (e.g. virtual storage size, dynamic class table). The job execution including partition allocation and deallocation is done by the system, that is system resources are only used when needed. It is easy to migrate jobs from static to dynamic partitions, as incompatibilities (control blocks, services, etc.) are kept as low as possible. The present invention provides additional, new partitions for the VSE operating system. Thus many more programs can be executed in parallel. The concept is very flexible and transferable to other operating systems. The dynamic partition concept is thus also open for further expansion.

Appendix:
Definitions

Some of the definitions in this glossary are copied from IBM VSE/AF Planning and Installation Version 4 Release 1, SC33-6351.

A
address space
A subdivision of the total of virtual storage.

ASI (automated system initialization)
A function that allows control information for system start up to be cataloged for automatic retrieval during system start up.

ASI procedure
A set of control statements which specify values for an automatic system initialization.

C
control program
A computer program designed to schedule and to supervise the processing of programs of a computer system.

D
dynamic partition
A partition allocated for one job, created and activated on an as needed basis. After processing the occupied space is released.

G
GETVIS area
storage space within a partition or the shared virtual area, available for temporary allocation to programs.

J
job
(1) A set of data that completely defines a unit of work for a computer. A job usually includes all necessary computer programs, linkages, files, and instructions to the operating system.
(2) The actual processing of a unit of work by a computer.

job control language (JCL)
A control language that can be used to: (a) identify a job to an operating system, (b) describe the job requirements.

M
main task
A partition is started with one task called main task. This task executes the job and may attach further tasks (subtasks).

P
partition
A division of the address space that is available for program execution. The supervisor control program, however, does not run in this space.

private area
A division of the address space, where one or more partitions may be allocated, unique to all other address spaces.

program
A sequence of instructions suitable for processing by a computer.

program area
An area of the partition, where a program is to be loaded.

S
shared area(s)
A division of the address space common for all address spaces. Shared partitions, the shared virtual area and the supervisor belong to the shared area.

shared partition
In VSE, a partition allocated for a program that provides services for and communicates with programs in other partitions of the system's virtual address spaces. A shared partition is part of the shared areas.

shared virtual area (SVA)
In VSE, an area that contains a list of frequently used phases, resident programs shared between partitions and an area for system support.

spooling
Reading and writing input and output streams on an intermediate device in a format convenient for later processing or output.

static partition
A partition that is allocated by an operator or ASI procedure and is usually available for more than one job.

subtask
A task that is initiated by the main task or by another (sub)task.

supervisor
A part of a control program that coordinates the use of resources and maintains the flow of processor operations.

T
task
A basic unit of synchronous program execution. A task competes with other tasks for system resources such as processing time and I/O channels.

time slicing
A mode of operation in which several processes are assigned quanta of time on the same processor.

V
VSE/POWER
An IBM licensed program primarily used to spool input and output, it is the short version of Virtual Storage Extended/Priority Output Writer Execution Reader.

I claim:

1. A computer system comprising:
 a virtual storage;
 first operating system means for dividing said virtual storage into address spaces of predetermined capacity for parallel program execution in a number of partitions pre-allocated to said address spaces, said address spaces containing shared areas and private areas; and second operating system means for allocating dynamic partitions to said address spaces for jobs to be activated for parallel execution, the sizes of said dynamic partitions to be allocated depending on the jobs to be executed; and wherein each of said dynamic partitions has its own address space and only one dynamic partition is allocated to the private area of that address space; and said second operating system means initiating and controlling the execution of said jobs and de-allocating one of said allocated dynamic partitions after the job allocated to it is terminated, to free the address space of the de-allocated partition for other use.

2. Computer system according to claim 1, wherein said second operating system means temporarily allocates together with a dynamic partition a dynamic address area as a private system area which contains system data for the address space unique to the job.

3. Computer system according to claim 1, wherein said second operating system means allocates multiple dynamic partitions at a time.

4. Computer system according to claim 1, wherein said second operating system means groups said dynamic partitions into dynamic classes of executable jobs, whereby a dynamic class table is generated which contains the attributes of said private system area including storage allocation, partition size, and private system area size.

5. Computer system according to claim 4, wherein a priority of execution is assigned to each of said dynamic classes and a dynamic partition is only allocated when a job is to be executed in a dynamic class.

6. Computer system according to claim 4, wherein a dynamic class contains preallocated static and as well as dynamic partitions where execution of jobs assigned to static partitions has priority over the execution of jobs assigned to dynamic partitions.

7. Computer system according to claim 4, comprising means for time slicing dynamic partitions within a same one of said dynamic classes.

8. Computer system according to claim 4, wherein said class table is stored in a library from where it is accessed for allocating dynamic partitions, executing jobs and updating and maintaining tables.

9. Computer system according to claim 4, wherein each of said dynamic classes comprising its own dispatcher queue which has entries for all allocated dynamic partitions of a given dynamic class, the highest priority static partition or dynamic class to run is selected from said dispatcher queue, where, if a dynamic class is selected, the highest priority partition of the class ready to run is determined and the corresponding highest priority task ready to run is selected and dispatched.

10. Computer system according to claim 4, wherein said second operating system means provides the following operation:

request allocation of a dynamic partition, if a job for an enabled dynamic class table is found;

activate an allocation service program which builds a partition identifier, and allocates and initializes control blocks and creates an address space;

activate a partition start service routine which makes the dynamic partition ready to run;

during dynamic partition initialization, validate the address space, load job controls and prepare the dynamic partition;

after successful initialization, execute the job; and for dynamic partition, de-allocate the partition, and free the partition identifier and the system space allocated for control information thereby removing the dynamic partition from the dynamic class dispatching queue.

11. Computer system according to claim 4, wherein said dynamic class table contains the following attributes:

a) a storage allocation specifying the storage requirement of a dynamic partition, including a storage allocation for a dynamic address area and partition allocation of a given class;

b) a partition size defining an amount of contiguous virtual storage in a partition reserved for program execution;

c) a dynamic address area size defining an amount of contiguous virtual storage for a dynamic address area;

d) a profile or procedure to be executed in a partition prior to the job;

e) a maximum number of dynamic partitions within one class specifying a maximum number of partitions that can be allocated in parallel within a given class when enough virtual storage and dynamic partitions are available;

f) a disable indication allowing disabling of a dynamic class; and g) an identity of spooled I/O devices which interface to an input/output spooled.

* * * * *